United States Patent Office 2,969,378
Patented Jan. 24, 1961

2,969,378
α-QUINONEYLIDINE ETHYL β-HYDROXY ARYL β-PHOSPHORIC ACID ESTER

William K. T. Gleim, Island Lake, and Ralph B. Thompson, Hinsdale, Ill., assignors, by mesne assignments, to Universal Oil Products Company, Des Plaines, Ill., a corporation of Delaware No Drawing. Filed Jan. 16, 1958, Ser. No. 709,167

1 Claim. (Cl. 260—396)

This invention relates to a novel composition of matter, and to the manufacture and use thereof.

The novel composition of matter of the present invention is selected from those illustrated by the following general structures:

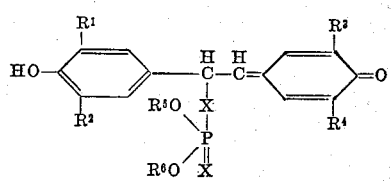

and

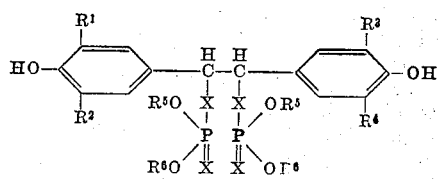

where $R^1$, $R^2$, $R^3$, $R^4$, $R^5$ and $R^6$ are selected from the group consisting of hydrogen and alkyl groups, and X is selected from the group consisting of oxygen and sulfur.

The novel composition of matter is prepared by the reaction of stilbene quinone with a phosphoric acid or a dithiophosphoric acid and may be illustrated by the following general equations. The first equation illustrates the reaction of one molar proportion of stilbene quinone with one molar proportion of phosphoric acid.

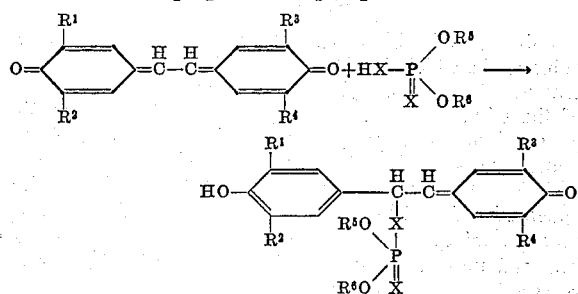

The second equation illustrates the reaction of one molar proportion of stilbene quinone with two molar proportions of phosphoric acid.

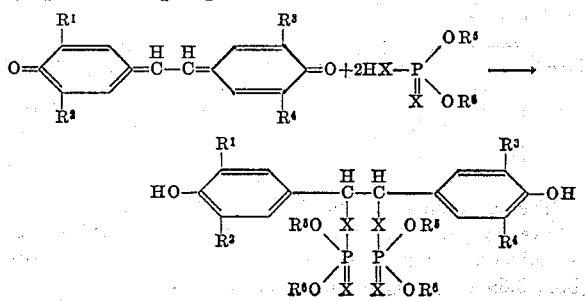

The symbols $R^1$ through $R^6$ and X have the same significance as indicated above.

Any suitable stilbene quinone may be used in preparing the novel composition of matter. When the composition of matter is to be used as an antioxidant for preventing deterioration of organic substances due to oxygen, preferably $R^1$, $R^2$, $R^3$ and $R^4$ are tertiary alkyl groups and are selected from the groups consisting of tert-butyl, tert-pentyl, tert-hexyl, tert-heptyl, tert-octyl, tert-nonyl, tert-decyl, etc. Although it generally is preferred that these tertiary alkyl groups are the same, in some cases they may be different as, for example, $R^1$ and $R^3$ being tertiary butyl groups and $R^2$ and $R^4$ being tertiary pentyl groups. In still another embodiment $R^1$, $R^2$, $R^3$ and $R^4$ may be secondary or primary alkyl groups and will be selected from methyl, ethyl, n-propyl, isopropyl, n-butyl, sec-butyl, n-pentyl, sec-pentyl, n-hexyl, sec-hexyl, n-heptyl, sec-heptyl, n-octyl, sec-octyl, n-nonyl, sec-nonyl, n-decyl, sec-decyl, etc. It is understood that the various stilbene quinones which may be used as reactants are not necessarily equivalent and also that two or more different stilbene quinones may be employed.

Any suitable phosphoric acid or thiophosphoric acid and preferably alkyl and more particularly dialkyl substituted acids may be employed in preparing the novel composition of matter of the present invention. In one embodiment alkyl and preferably dialkyl dithiophosphoric acids are employed. Dialkyl dithiophosphoric acids include diisopropyl dithiophosphoric acid, dibutyl dithiophosphoric acid, dipentyl dithiophosphoric acid, dihexyl dithiophosphoric acid, diheptyl dithiophosphoric acid, dioctyl dithiophosphoric acid, dinonyl dithiophosphoric acid, didecyl dithiophosphoric acid, diundecyl dithiophosphoric acid, didodecyl dithiophosphoric acid, ditridecyl dithiophosphoric acid, ditetradecyl dithiophosphoric acid, dipentadecyl dithiophosphoric acid, dihexadecyl dithiophosphoric acid, diheptadecyl dithiophosphoric acid, dioctadecyl dithiophosphoric acid, dinonadecyl dithiophosphoric acid, dieicosyl dithiophosphoric acid, etc. Conveniently, these alkyl groups are introduced through the use of fatty alcohols and thus the alkyl groups may be selected from capryl, lauryl, myristyl, palmityl, stearyl, cetyl, etc. It is understood that the alkyl groups may be straight or branched chain, that the alkyl groups may be primary, secondary or tertiary substituents, and that $R^5$ and $R^6$ may comprise the same or different alkyl groups. Monoalkyl dithiophosphoric acids, when employed, preferably comprise those in which the alkyl group is selected from those hereinbefore set forth.

In another embodiment of the invention alkyl or dialkyl phosphoric acids are utilized in preparing the novel composition of matter of the present invention. Illustrative alkyl and dialkyl phosphoric acids include isopropyl phosphoric acid, diisopropyl phosphoric acid, butyl phosphoric acid, dibutyl phosphoric acid, pentyl phosphoric acid, dipentyl phosphoric acid, hexyl phosphoric acid, dihexyl phosphoric acid, heptyl phosphoric acid, diheptyl phosphoric acid, octyl phosphoric acid, dioctyl phosphoric acid, nonyl phosphoric acid, dinonyl phosphoric acid, decyl phosphoric acid, didecyl phosphoric acid, undecyl phosphoric acid, diundecyl phosphoric acid, dodecyl phosphoric acid, didodecyl phosphoric acid, tridecyl phosphoric acid, ditridecyl phosphoric acid, pentadecyl phosphoric acid, dipentadecyl phosphoric acid, hexadecyl phosphoric acid, dihexadecyl phosphoric acid, heptadecyl phosphoric acid, diheptadecyl phosphoric acid, octadecyl phosphoric acid, dioctadecyl phosphoric acid, nonadecyl phosphoric acid, dinonadecyl phosphoric acid, eicosyl phosphoric acid, dieicosyl phosphoric acid, etc. Here again, it is understood that, in the dialkyl phosphoric acids, the alkyl groups may be the same or different.

When desired, a mixture of the mono- and/or dialkyl phosphoric acids and/or mono- and/or dialkyl dithiophosphoric acid may be employed. In some cases these are recovered as a mixture and may be used in the present invention without the added cost of separating the individual compounds. For example, a mixture of mono- and dioctyl phosphoric acids is available commerically, generally at a lower cost than the individual compounds, and may be used in the present invention. It is understood that the various phosphates which may be used in preparing the novel composition of matter of the present invention are not necessarily equivalent but generally will be selected with reference to the end use of the final composition of matter.

Referring to the general structure hereinbefore set forth, it will be noted that the final product contains an aromatic ring. The substituted stilbene quinone aromatizes readily and thus the final product will contain the aromatic configuration. Accordingly, the reaction of the present invention may be considered as an addition-rearrangement type.

The reaction of the stilbene quinone and phosphoric or thiophosphoric acid is effected in any suitable manner. The reaction is exothermic and preferably is controlled by effecting the same in the presence of an inert solvent. Any suitable solvent may be employed. Dimethyl formamide is particularly preferred. Other formamides include diethyl formamide, dipropyl formamide, dibutyl formamide, etc. Aromatic hydrocarbon solvents include benzene, toluene, xylene, ethylbenzene, cumene, etc. Other solvents include saturated aliphatic esters, as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The specific temperature of reaction will depend upon whether a solvent is employed and, when used, upon the particular solvent. In general, the temperature may range from about $-20°$ to about $100°$ C. and in some cases up to $150°$ C., although temperatures outside of this range may be employed, depending upon the specific reactants and solvents utilized.

The reaction normally is readily effected in the absence of a catalyst. However, in some cases, a catalyst may be employed. Illustrative catalysts include anhydrous hydrogen chloride, benzene sulfonic acid, p-toluene sulfonic acid, piperidine, etc.

From the equation hereinbefore set forth, it will be noted that one or two mole equivalents of phosphoric acid or thiophosphoric acid reacts with one mole equivalent of stilbene quinone. When equal molar proportions of the acid and stilbene quinone react, the composition of matter will have the structure shown in the first equation. On the other hand, when two molar proportions of acid react with one molar proportion of stilbene quinone, the composition of matter will have the structure shown in the second equation. However, for most cases, the product will contain a mixture of the mono- and diphosphates. While the individual compounds may be separated, in general the mixed product is satisfactory for most uses and particularly as an additive to organic substances and thus the mixed product may be so employed without incurring the additional expense of separating the individual compounds.

The novel composition of matter of the present invention has a wide range of utility. It is particularly advantageous for use as an additive to organic substances and particularly gasoline and heavier oil, including specifically lubricating oil, fuel oil, diesel oil, marine oil, transformer oil, turbine oil, cutting oil, rol'ing oil, slushing oil, etc. These oils may be petroleum oils or they may be synthetically prepared and thus include poly- esters and particularly diesters as, for example, sebacates, azelates, pimelates, adipates, pinates, etc., polyolefins including polyethylenes, polypropylenes, polybutylenes, etc., derivatives thereof including polyethylene glycols, polypropylene glycols, etc., polyethers, esters of pentaerythritol, etc., as well as these in admixtures with petroleum oils. It is understood that the novel composition of matter of the present invention may be used as an additive for other organic compounds which undergo deterioration in transportation, storage or in use, or as a plasticizer, flotation agent, etc. When the composition of matter contains halogen substituents, it may be used as an insecticide, fungicide, pesticide, algicide, rodenticide, etc.

As hereinbefore set forth, the composition of matter is of especial utility for use in lubricating oil. The reaction product serves a number of important functions including oxidation inhibitor (peroxide decomposer), bearing corrosion inhibiter, ring anti-plugging additive, extreme pressure additive, etc. The composition of matter also is of particular utility in gasoline and heavier oils, in which case the composition of matter serves to improve the oil in one or more ways including preventing oxidation, preventing sediment or sludge formation, dispersion of sediment when formed, retarding or preventing discoloration, corrosion inhibitor, etc.

The composition of matter generally is recovered as a viscous liquid or solid. It may be marketed as such or as a solution in a suitable solvent including, for example, saturated paraffinic hydrocarbons including pentane, hexane, heptane, octane, etc., aromatic hydrocarbons including benzene, toluene, xylene, cumene, etc., alcohols, ketones, etc.

The concentration of composition of matter to be used as an additive will depend upon the particular organic substrate in which it is to be used. In general, the additive will be used in a concentration of from about 0.0001% to about 15% by weight or more, and more specifically in a concentration of from about 0.001% to about 3% by weight of the substrate. The additive is incorporated in the substrate in any suitable manner and preferably the mixture is suitably agitated or otherwise mixed in order to obtain intimate admixing of the additive and the substrate.

The following examples are introduced to illustrate further the novelty and utility of the present invention but not with the intention of unduly limiting the same.

EXAMPLE I

This example illustrates the reaction of a stilbene quinone, in which $R^1$, $R^2$, $R^3$ and $R^4$ are tertiary butyl groups, with diisopropyl dithiophosphoric acid. 10 gm. of the stilbene quinone was mixed with 100 cc. of dimethyl formamide and 10 gm. of diisopropyl dithiophosphoric acid was added to the mixture. Within the course of 2-3 minutes the red color of the stilbene quinone disappeared and all of the material went into solution. The reaction mixture was heated on a steam bath, filtered hot, and upon cooling a precipitate formed. After two recrystallizations from methanol and water, the product melted at 180-181° C. This product is

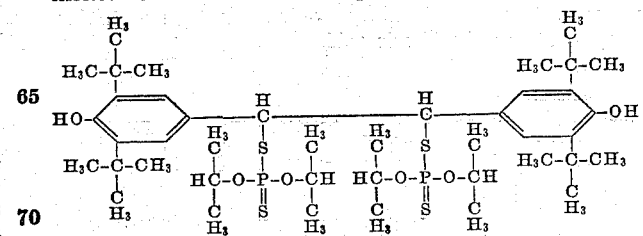

The calculated carbon, hydrogen and sulfur for the above compound are 58.44%, 8.41% and 14.86%, respectively. Actually found by analyses are 59.17% carbon, 8.69% hydrogen and 15.4% sulfur.

EXAMPLE II

The novel composition of matter prepared in the manner described in Example I was evaluated as an antioxidant in gasoline. The gasoline had a blank (without additive) induction period of 80 minutes. However, another sample of the gasoline containing 0.005% by weight of the composition of matter described in Example I had an induction period of 335 minutes.

EXAMPLE III

Another composition of matter similar to that described in Example I was prepared except that the dialkyl dithiophosphoric acid was O-capryl-O-stearyl dithiophosphoric acid. This reaction was effected in substantially the same manner as described in Example I except for the use of the different dialkyl dithiophosphoric acid. The product corresponds to the structure shown in Example I except that the isopropyl groups are replaced by capryl and stearyl groups. This product was evaluated as a lubricating oil additive in the manner described in Example IV.

EXAMPLE IV

This example illustrates the use of the composition of matter prepared in Example III as an additive to lubricating oil. These evaluations were conducted in a Lauson engine. A typical commercial paraffinic solvent extracted lubricating oil was used. The engine was run with a jacket temperature of 350° F. and an oil temperature of 180° F. A sample of the lubricating oil without additive was used as a control sample. 0.5% by weight of the composition of matter described above was incorporated in another sample of the same lubricating oil. Pertinent data of these runs are reported in the following table:

*Table I*

|  | No Additive | Additive of Example III |
|---|---|---|
| Length of test, hours | 24 | 100 |
| Oil ring plugging, percent | 60 | 10 |
| Bearing weight loss, grams | 1.6094 | 0.0196 |
| Oil consumption, ml./hr | 28.50 | 9.7 |
| Neutralization number of used oil | 1.07 | 0.12 |

The run with the control sample of oil was discontinued after 24 hours because the engine stuck and further operation was impossible. On the other hand, the run using the sample of oil containing the additive continued for 100 hours as indicated in the above table.

It will be noted that the bearing weight loss was considerably reduced through the use of the additive, as was also the oil consumption. Furthermore, it will be noted that the oil containing the additive had a considerably lower neutralization number than the oil without additive, thus illustrating the antioxidant or peroxide decomposing properties of the additive.

EXAMPLE V

Two molar equivalents of the stilbene quinone described in Example I are mixed with diethyl formamide and a mixed mono- and dioctyl orthophosphoric acid is added to the mixture. After a few minutes, the red color of the stilbene quinone disappears. The reaction mixture is heated on a steam bath, filtered hot and cooled. The precipitate is recrystallized from methanol and water. The product is a mixture of the mono- and dioctyl phosphates of the stilbene quinone. While the individual compounds may be recovered from the mixture if desired, the mixture may be used as such and the expensive and complicated separation process is avoided.

We claim as our invention:

A compound of the formula:

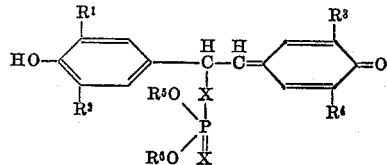

where $R^1$, $R^2$, $R^3$, and $R^4$ are selected from the group consisting of hydrogen and alkyl of from 1 to 10 carbon atoms and $R^5$ and $R^6$ are selected from the group consisting of hydrogen and alkyl of from 3 to 20 carbon atoms, and X is selected from the group consisting of oxygen and sulfur.

References Cited in the file of this patent
UNITED STATES PATENTS

| 2,480,072 | Ziegler | Aug. 23, 1949 |
| 2,560,543 | Bartleson | July 17, 1951 |
| 2,589,326 | Oberright | Mar. 18, 1952 |
| 2,680,132 | Schrader et al. | July 1, 1954 |
| 2,681,918 | Pederson | June 22, 1954 |

OTHER REFERENCES

Atherton et al.: J. Chem. Soc., vol. 1948, p. 1106 (1948).

Kosolapoff: Organo Phosphorous Compounds, John Wiley, New York, p. 230 (1950).